(12) United States Patent
Natabe et al.

(10) Patent No.: US 10,670,146 B2
(45) Date of Patent: Jun. 2, 2020

(54) PISTON RING FOR COMBUSTION ENGINE

(71) Applicant: KABUSHIKI KAISHA RIKEN, Chiyoda-ku, Tokyo (JP)

(72) Inventors: Kazunori Natabe, Tokyo (JP); Naoya Honjou, Tokyo (JP)

(73) Assignee: KABUSHIKI KAISHA RIKEN, Chiyoda-ku, Tokyo (JP)

( * ) Notice: Subject to any disclaimer, the term of this patent is extended or adjusted under 35 U.S.C. 154(b) by 246 days.

(21) Appl. No.: 15/740,064

(22) PCT Filed: Jun. 29, 2016

(86) PCT No.: PCT/JP2016/003124
§ 371 (c)(1),
(2) Date: Dec. 27, 2017

(87) PCT Pub. No.: WO2017/006545
PCT Pub. Date: Jan. 12, 2017

(65) Prior Publication Data
US 2018/0187780 A1    Jul. 5, 2018

(30) Foreign Application Priority Data

Jul. 9, 2015    (JP) .................................. 2015-137671

(51) Int. Cl.
*F02F 5/00* (2006.01)
*F16J 9/20* (2006.01)
(Continued)

(52) U.S. Cl.
CPC .................. *F16J 9/20* (2013.01); *F02F 5/00* (2013.01); *F16J 9/063* (2013.01); *F16J 9/14* (2013.01);
(Continued)

(58) Field of Classification Search
CPC ...... F02F 5/00; F16J 9/063; F16J 9/069; F16J 9/14; F16J 9/20; F16J 9/26
See application file for complete search history.

(56) References Cited

U.S. PATENT DOCUMENTS 2,092,413 A * 9/1937 Farmer ...................... F16J 9/14
277/497
2,253,739 A * 8/1941 Trexler ...................... F16J 9/20
277/455
(Continued)

FOREIGN PATENT DOCUMENTS

CN          2763548 Y      3/2006
CN       101581259 A      11/2009
(Continued)

OTHER PUBLICATIONS

Aug. 2, 2018, Third Party Submission issued by the Japan Patent Office in the corresponding Japanese Patent Application No. 2015-137671.
(Continued)

*Primary Examiner* — George C Jin
*Assistant Examiner* — Teuta B Holbrook
(74) *Attorney, Agent, or Firm* — Kenja IP Law PC

(57) ABSTRACT

Provided is a piston ring for an internal combustion engine that enables size reduction of a chamfered edge without leading to the chipping, and sufficient size reduction of a flow passage of a blow-by gas in a piston ring gap, thus effectively restraining the blow-by gas from passing through the piston ring gap. A piston ring 1 with a piston ring gap 2 used for an internal combustion engine includes a chamfered edge 3 continuous to at least one of piston ring end faces at the piston ring gap 2 and an outer peripheral surface 1*a* of the piston ring 1. The chamfered edge 3 has a curved shape.

14 Claims, 5 Drawing Sheets

(51) Int. Cl.
*F16J 9/14* (2006.01)
*F16J 9/06* (2006.01)
*F16J 9/26* (2006.01)

(52) U.S. Cl.
CPC ......... *F16J 9/26* (2013.01); *F05C 2201/0448* (2013.01); *F16J 9/069* (2013.01)

(56) References Cited

U.S. PATENT DOCUMENTS

| | | | | |
|---|---|---|---|---|
| 2,404,616 | A * | 7/1946 | Bramberry | F16J 9/26 277/443 |
| 3,455,565 | A * | 7/1969 | Jepsen | F16J 9/28 277/497 |
| 4,533,149 | A | 8/1985 | Vater et al. | |
| 5,035,210 | A * | 7/1991 | Arai | F02F 3/00 123/193.6 |
| 5,325,940 | A * | 7/1994 | Rueckert | F16D 65/18 188/71.8 |
| 5,469,616 | A * | 11/1995 | Miyazaki | F16J 9/066 29/888.07 |
| 5,882,012 | A * | 3/1999 | Niwa | F16J 9/14 277/407 |
| 5,934,680 | A * | 8/1999 | Kakehi | B63H 23/32 277/499 |
| 5,934,685 | A * | 8/1999 | Danzer | F16J 9/14 277/498 |
| D668,941 | S * | 10/2012 | Taurins | D8/367 |
| 8,454,024 | B2 * | 6/2013 | Kakehi | F16J 15/441 277/496 |
| 9,334,959 | B2 * | 5/2016 | Hartford | F16J 9/12 |
| 2002/0043768 | A1 * | 4/2002 | Fenn | F16F 9/3214 277/434 |
| 2011/0100318 | A1 * | 5/2011 | Higuchi | F16J 9/20 123/193.6 |
| 2015/0184748 | A1 * | 7/2015 | Sytsma | F16J 9/066 277/310 |
| 2016/0069455 | A1 * | 3/2016 | Hartford | F16J 9/12 277/496 |
| 2016/0069456 | A1 * | 3/2016 | Mahl | F16J 9/20 277/434 |
| 2016/0076649 | A1 * | 3/2016 | Fukuma | F16J 9/10 277/437 |
| 2017/0016538 | A1 * | 1/2017 | Matos Cordeiro Costa | C23C 14/0641 |
| 2017/0175893 | A1 * | 6/2017 | Fujita | F02F 5/00 |
| 2017/0227126 | A1 * | 8/2017 | Kawasaki | F16J 9/064 |
| 2018/0031127 | A1 * | 2/2018 | Takezawa | F16J 9/064 |

FOREIGN PATENT DOCUMENTS

| | | | | |
|---|---|---|---|---|
| CN | 202039965 | U | 11/2011 | |
| JP | 58067946 | A * | 4/1983 | F16J 9/14 |
| JP | S5867946 | A | 4/1983 | |
| JP | H01156356 | U | 10/1989 | |
| JP | H0258165 | U | 4/1990 | |
| JP | H0624608 | Y2 | 6/1994 | |
| JP | H0875007 | A | 3/1996 | |
| JP | H0989111 | A | 3/1997 | |
| JP | H1089476 | A | 4/1998 | |
| JP | 2006017287 | A | 1/2006 | |
| WO | 2013031548 | A1 | 3/2013 | |
| WO | WO-2015199183 | A9 * | 9/2016 | F02F 5/00 |

OTHER PUBLICATIONS

Jan. 31, 2019, the Extended European Search Report issued by the European Patent Office in the corresponding European Patent Application No. 16821021.9.
Jan. 9, 2018, International Preliminary Report on Patentability issued in the International Patent Application No. PCT/JP2016/003124.
Feb. 3, 2019, Office Action issued by the State Intellectual Property Office in the corresponding Chinese Patent Application No. 201680039829.
Apr. 23, 2019, Notification of Reasons for Refusal issued by the Japan Patent Office in the corresponding Japanese Patent Application No. 2015-137671.
Nov. 19, 2019, Official Decision of Refusal issued by the Japan Patent Office in the corresponding Japanese Patent Application No. 2015-137671.
Oct. 12, 2019, Office Action issued by the China National Intellectual Property Administration in the corresponding Chinese Patent Application No. 201680039829.X.
Aug. 30, 2016, International Search Report issued in the International Patent Application No. PCT/JP2016/003124.

* cited by examiner

PISTON RING FOR COMBUSTION ENGINE

TECHNICAL FIELD

The disclosure herein relates to a piston ring for an internal combustion engine to be mounted on a piston of an engine (an internal combustion engine) of, for example, an automobile and, in particular, to a piston ring for functioning as a top ring (a compression ring) mounted in the vicinity of a combustion chamber.

BACKGROUND

A piston ring used in an engine of an automobile is mounted in a ring groove formed on an outer peripheral surface of a piston. The piston ring has an outer peripheral surface to slide on an inner peripheral surface of a cylinder bore and one side face to contact a side wall of the ring groove, thereby restraining a fuel gas from leaking from a combustion chamber side to a crank chamber side, that is, restraining a blow-by gas. Restraining the blow-by gas enables prevention of the formation of sludge caused by contamination of a lubricating oil that may lead to adherence of an oil ring and degradation in performance of the engine.

The piston ring, to facilitate mounting thereof in the ring groove, is formed in a split ring shape with a piston ring gap. Thus, restraining the blow-by gas from passing through the piston ring gap should also be a concern. To restrain the blow-by gas from passing through the piston ring gap, it is important to minimize the piston ring gap within a range in which piston ring end faces do not contact each other due to thermal expansion caused by passage of a combustion gas.

Further, the piston rings having the piston ring gap are commonly provided with chamfered edges on the outer peripheral edges of a pair of piston ring end faces facing each other across the piston ring gap as illustrated in, for example, the PLT1 set forth below. In this case, since a chamfered amount severely affects a passage area of the blow-by gas in the piston ring gap, the chamfered amount is minimized so as to repress the occurrence of the blow-by gas.

CITATION LIST

Patent Literature

PLT 1: JP-A-2006-17287

SUMMARY

Technical Problem

It is anticipated that in the future automotive engines will transition to smaller direct-injection turbo-engines, seeking for better combustion efficiency and fuel economy. However, due to a high combustion pressure in cylinders of the direct-injection turbo-engine, further performance to restrain the blow-by gas from passing through the piston ring gap is required. To restrain the blow-by gas from passing through the piston ring gap, it is effective, as described above, to reduce a size of a flow passage of the blow-by gas by decreasing the chamfered amount at the outer peripheral edge of the ring gap end surface.

However, having chamfered edges on outer peripheral edges of the piston ring end faces, conventional piston rings have a common problem that the reduction in the chamfered amount may lead to chipping of the chamfered edges at the mounting of the piston ring on the piston, hindering sufficient size reduction of the flow passage of the blow-by gas in the piston ring gap.

In light of the above problem, the disclosure herein provides a piston ring for an internal combustion engine that enables the reduction in an amount to round off the edge without leading to the chipping to sufficiently reduce the flow passage of the blow-by gas in the piston ring gap, thus effectively restraining the blow-by gas from passing through the piston ring gap.

Solution to Problem

A piston ring for an internal combustion engine according to the disclosure herein is a piston ring with a piston ring gap used for the internal combustion engine. The piston ring has a chamfered edge continuous to at least one of piston ring end faces at the piston ring gap and an outer peripheral surface of the piston ring. The chamfered edge has a curved shape.

According to the piston ring for an internal combustion engine according to the disclosure herein having the above configuration, preferably, the chamfered edge includes at least two arcuate surfaces.

According to the piston ring for an internal combustion engine according to the disclosure herein having the above configuration, preferably, at an intersection between the chamfered edge and the outer peripheral surface of the piston ring, a tangential direction of the chamfered edge tilts at an acute angle relative to a tangential direction of the outer peripheral surface of the piston ring.

According to the piston ring for an internal combustion engine according to the disclosure herein having the above configuration, preferably, the chamfered edge has a circumferential width (L1) along a circumferential direction of the piston ring greater than a radial width (L2) along a radial direction of the piston ring.

According to the piston ring for an internal combustion engine according to the disclosure herein having the above configuration, preferably, the chamfered edge has a ratio (L1/L2) of the circumferential width (L1) along the circumferential direction of the piston ring to the radial width (L2) along the radial direction of the piston ring between 0.6 to 2.0.

According to the piston ring for an internal combustion engine according to the disclosure herein having the above configuration, preferably, the chamfered edge includes a first arcuate surface, a second arcuate surface formed between the first arcuate surface and the outer peripheral surface of the piston ring, and a third arcuate surface formed between the first arcuate surface and the piston ring end face. A ratio (R3/R1) of a radius (R3) of the third arcuate surface to a radius (R1) of the first arcuate surface is preferably 0.050 to 0.5.

According to the piston ring for an internal combustion engine according to the disclosure herein having the above configuration, preferably, the chamfered edge includes a first arcuate surface, a second arcuate surface formed between the first arcuate surface and the outer peripheral surface of the piston ring, and a third arcuate surface formed between the first arcuate surface and the piston ring end face. A ratio (R2/R1) of a radius (R2) of the second arcuate surface to the radius (R1) of the first arcuate surface is preferably 0.1 to 0.8.

According to the piston ring for an internal combustion engine according to the disclosure herein having the above configuration, preferably, a pair of piston ring end faces facing each other across the piston ring gap each include the chamfered edge. A ratio (L1a/L1b) of a circumferential width (L1a) of one of the chamfered edges along the circumferential direction of the piston ring to a circumferential width (L1b) of the other of the chamfered edges along the circumferential direction of the piston ring is preferably 0.30 to 3.00.

According to the piston ring for an internal combustion engine according to the disclosure herein having the above configuration, preferably, a pair of piston ring end faces facing each other across the piston ring gap each include the chamfered edge. A ratio (L2a/L2b) of a radial width (L2a) of one of the chamfered edges along the radial direction of the piston ring to a radial width (L2b) of the other of the chamfered edges along the radial direction of the piston ring is preferably 0.30 to 3.00.

According to the piston ring for an internal combustion engine according to the disclosure herein having the above configuration, preferably, a pair of piston ring end faces facing each other across the piston ring gap each include the chamfered edge. The chamfered edge preferably includes a first arcuate surface, a second arcuate surface formed between the first arcuate surface and the outer peripheral surface of the piston ring, and a third arcuate surface formed between the first arcuate surface and the piston ring end face. A ratio (R1a/R1b) of a radius (R1a) of the first arcuate surface of one of the chamfered edges to a radius (R1b) of the first arcuate surface of the other of the chamfered edges is preferably 0.18 to 5.50.

According to the piston ring for an internal combustion engine according to the disclosure herein having the above configuration, preferably, a pair of piston ring end faces facing each other across the piston ring gap each include the chamfered edge. The chamfered edge preferably includes a first arcuate surface, a second arcuate surface formed between the first arcuate surface and the outer peripheral surface of the piston ring, and a third arcuate surface formed between the first arcuate surface and the piston ring end face. A ratio (R2a/R2b) of a radius (R2a) of the second arcuate surface of one of the chamfered edges to a radius (R2b) of the second arcuate surface of the other of the chamfered edges is preferably 0.18 to 5.50.

According to the piston ring for an internal combustion engine according to the disclosure herein having the above configuration, preferably, a pair of piston ring end faces facing each other across the piston ring gap each include the chamfered edge. The chamfered edge preferably includes a first arcuate surface, a second arcuate surface formed between the first arcuate surface and the outer peripheral surface of the piston ring, and a third arcuate surface formed between the first arcuate surface and the piston ring end face. A ratio (R3a/R3b) of a radius (R3a) of the third arcuate surface of one of the chamfered edges to a radius (R3b) of the third arcuate surface of the other of the chamfered edges is preferably 0.18 to 5.50.

Advantageous Effect

The piston ring according to the disclosure herein enables size reduction of the chamfered edge without leading to the chipping and sufficient size reduction of a flow passage of a blow-by gas in the piston ring gap. Thus, the piston ring is capable of effectively restraining the blow-by gas from passing through the piston ring gap of an internal combustion engine having the piston ring.

DETAILED DESCRIPTION

Hereinafter, the disclosure herein will be described in further detail by using examples with reference to the drawings.

Figure 1:
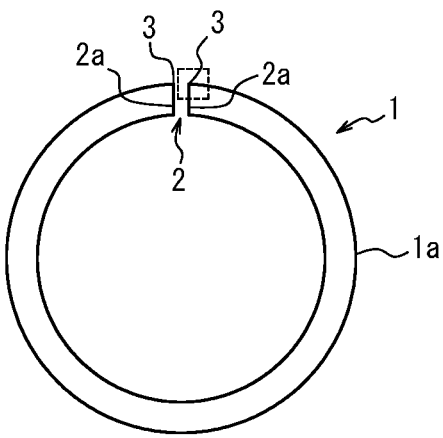
FIG. 1 is a plan view of a piston ring for an internal combustion engine according to an embodiment of the disclosure herein.

A piston ring 1 according to an embodiment of the disclosure herein illustrated in FIG. 1 functions as a top ring (a compression ring) to be mounted on a piston of an engine (an internal combustion engine) of, for example, an automobile and is formed in a split ring shape with a piston ring gap 2.

The piston ring 1 may be manufactured by, for example, subjecting a steel material to rolling and drawing process with a die, shaping a wire material thus obtained in a perfect circle or a cam-shape, cutting the wire material, and then subjecting a resulting wire material to processing such as side polishing and piston ring end surface grinding.

A cross-sectional shape perpendicular to a circumferential direction of the piston ring 1 is not limited and may be in, for example, a rectangular shape, an internally-beveled shape, or internally-cutout shape. Also, a shape of the outer peripheral surface of the piston ring 1 to slide on an inner peripheral surface of a cylinder bore (a cylinder liner) is not limited and may be in various shapes including a straight face, a tapered face, a barrel face, and an asymmetrically barreled face.

The piston ring gap 2 of the piston ring 1 is in a predetermined size (gap) in the circumferential direction, and a pair of piston ring end faces 2a are formed facing each other across the piston ring gap 2. An outer peripheral edge of each of the piston ring end faces 2a is provided with a chamfered edge 3. That is, the chamfered edge 3 is formed continuously to the piston ring end face 2a and an outer peripheral surface 1a of the piston ring 1. Note that the outer peripheral edge of the piston ring end face 2a refers to an edge formed by the piston ring end face 2a and the outer peripheral surface 1a of the piston ring 1.

Figure 2:
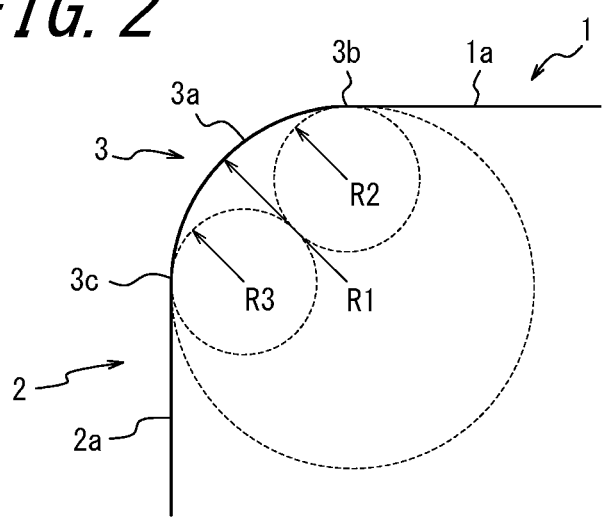
FIG. 2 is an enlarged view of a portion of the piston ring illustrated in FIG. 1 having a chamfered edge.

According to the disclosure herein, the chamfered edge 3 is formed in a curved shape. In FIG. 2, the chamfered edge 3 includes a first arcuate surface 3a, a second arcuate surface 3b formed between the first arcuate surface 3a and the outer peripheral surface 1a of the piston ring 1, and a third arcuate surface 3c formed between the first arcuate surface 1a and the piston ring end face 2a. FIG. 2 is an enlarged view of a portion surrounded by broken lines in FIG. 1.

Figure 3:
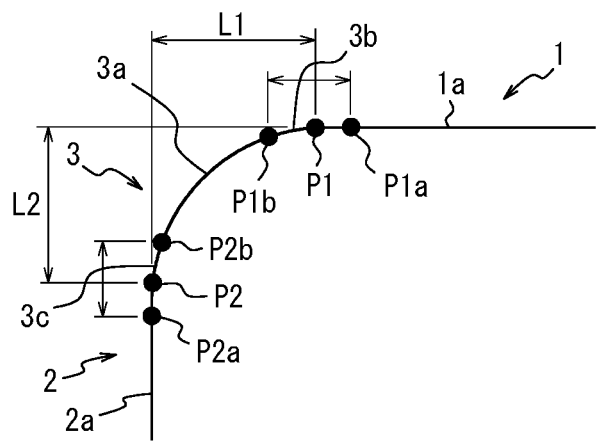
FIG. 3 is an explanatory diagram illustrating definitions of a first arcuate surface, a second arcuate surface, and a third arcuate surface.

In this case, as illustrated in FIG. 3, perpendicular lines perpendicular to an annular profile line that corresponds to the outer peripheral surface 1a of the piston ring 1 are drawn at points 0.005 mm in a circumferential direction from (on left and right sides of) an intersection P1 of the first arcuate surface 3a and the outer peripheral surface 1a of the piston ring 1. Intersections of these perpendicular lines and the chamfered edge 3 are referred to as intersections P1a and P1b, and a partial region of the chamfered edge 3 between the intersection P1a and the intersection P1b is referred to as the second arcuate surface 3b. Also, perpendicular lines perpendicular to a linear profile line that corresponds to the piston ring end face 2a of the piston ring 1 are drawn at points 0.005 mm in a radial direction from (on upper and lower sides of) an intersection P2 of the first arcuate surface 3a and the piston ring end face 2a. Intersections of these perpendicular lines and the chamfered edge 3 are referred to as intersections P2a and P2b, and a partial region of the chamfered edge 3 between the intersection P2a and the intersection P2b is referred to as the third arcuate surface 3c. A partial region of the chamfered edge 3 between the second arcuate surface 3b and the third arcuate surface 3c, i.e., the partial region of the chamfered edge 3 between the intersection P1b and the intersection P2b is referred to as the first arcuate surface 3a.

When including the three arcuate surfaces 3a, 3b, and 3c, the chamfered edge 3 is in a shape with a ratio of a radius R2 of the second arcuate surface 3b (see FIG. 2) to a radius R1 of the first arcuate surface 3a (see FIG. 2), i.e., R2/R1 of preferably 1.00 or less, more preferably 0.1 to 0.8. Also, the chamfered edge 3 is in a shape with a ratio of a radius R3 of the third arcuate surface 3c (see FIG. 2) to the radius R1 of the first arcuate surface 3a, i.e., R3/R1 of preferably 0.50 or less, more preferably 0.050 to 0.500.

Further, the chamfered potion 3 is preferably in a shape having: a ratio of the radius R1 of the first arcuate surface 3a to a circumferential width L1 of the chamfered edge 3 (see FIG. 3) along a circumferential direction of the piston ring 1, i.e., R1/L1 of between 1.00 and 4.50; a ratio of the radius R1 of the first arcuate surface 3a to a radial width L2 of the chamfered edge 3 (see FIG. 3) along a radial direction of the piston ring 1, i.e., R1/L2 of between 1.00 and 5.00, a ratio of the radius R2 of the second arcuate surface 3b to the radius R1 of the first arcuate surface 3a, i.e., R2/R1 of 1.00 or less; and a ratio of the radius R3 of the third arcuate surface 3c to the radius R1 of the first arcuate surface 3a, i.e., R3/R1 of 0.50 or less.

Figure 4:
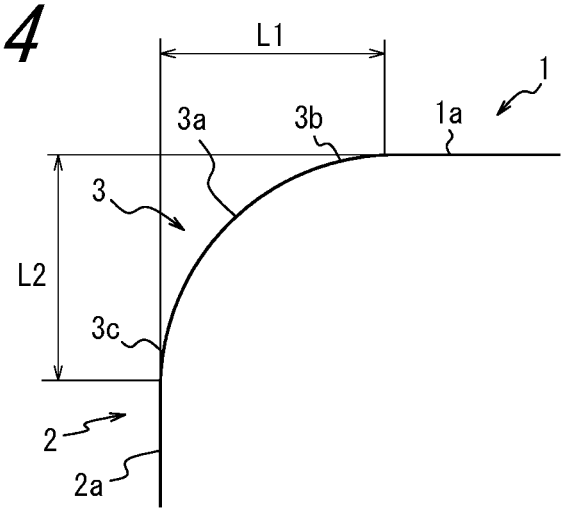
FIG. 4 is an explanatory diagram illustrating a chamfered edge formed on an outer peripheral edge at a piston ring gap.

The chamfered edge 3 having the curved shape as described above may have, for example, a curved shape including the three arcuate surfaces 3a, 3b, and 3c as illustrated in FIG. 4 that is formed by subjecting the outer peripheral edge of the piston ring gap 2 to barrel finishing and brushing. Note that the formation of the chamfered edge 3 having the curved shape is not limited to these methods and may use other methods.

According to the disclosure herein, as described above, the chamfered edge 3 having the curved shape formed by removing an edge enables a reduction in the circumferential width L1 of the chamfered edge 3 along the circumferential direction of the piston ring 1 and the radial width L2 along the radial direction of the piston ring 1, that is, enables a reduction in a chamfered amount of the chamfered edge, without making the chamfered edge 3 susceptible to the chipping. Sufficient size reduction of the chamfered edge 3 without leading to the chipping achieves sufficient size reduction of a flow passage of a blow-by gas in the piston ring gap 2, effectively restraining the blow-by gas from passing through the piston ring gap 2.

The chamfered edge 3 preferably has a ratio of the circumferential width L1 to the radial width L2, i.e., L1/L2 of 0.6 to 2.0. For example, in an example illustrated in FIG. 3, the chamfered edge 3 has the ratio of the circumferential width L1 to the radial width L2 of 1.0; in other words, the circumferential width L1 and the radial width L2 are equal to each other.

Figure 5:
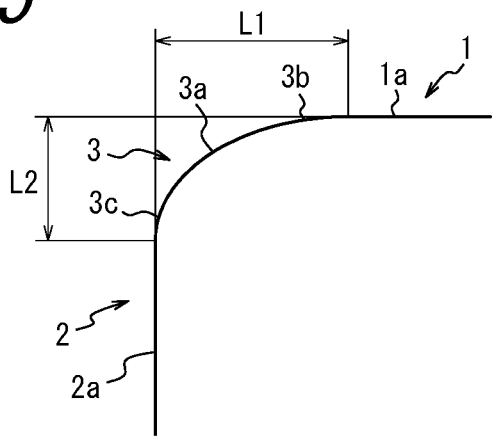
FIG. 5 is a variation of the chamfered edge illustrated in FIG. 2 where the chamfered edge has a circumferential width greater than a radial width.

As illustrated in a variation in FIG. 5, the chamfered edge 3 may have the circumferential width L1 greater than the radial width L2, thus preventing the chipping of the chamfered edge 3 in a more reliable manner.

Figure 6:
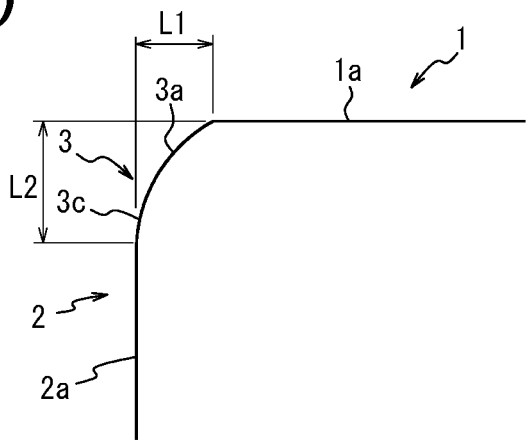
FIG. 6 is a variation of the chamfered edge illustrated in FIG. 2 where the chamfered edge includes the first arcuate surface and the third arcuate surface, and the circumferential width smaller than the radial width.

As illustrated in a variation in FIG. 6, the chamfered edge 3 may include the first arcuate surface 3a and the third arcuate surface 3c omitting the second arcuate surface 3b, and have the circumferential width L1 smaller than the radial width L2.

Figure 7:
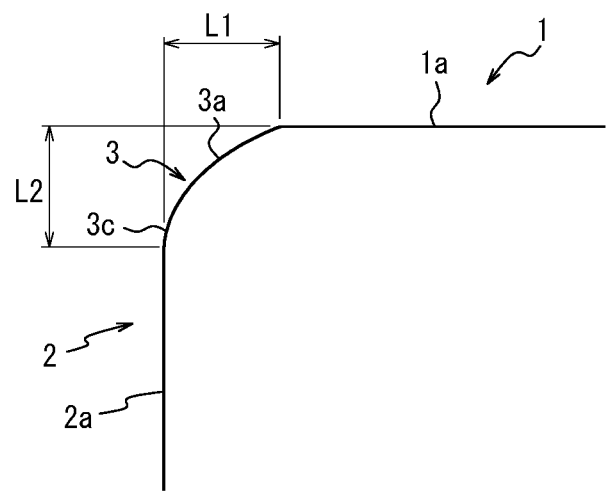
FIG. 7 is a variation of the chamfered edge illustrated in FIG. 2 where the chamfered edge includes the first arcuate surface and the third arcuate surface, and the circumferential width equal to the radial width.

As illustrated in a variation in FIG. 7, on the other hand, the chamfered edge 3 may include the first arcuate surface 3a and the third arcuate surface 3c omitting the second arcuate surface 3b, and have the circumferential width L1 and the radial width L2 equal to each other, or the circumferential width L1 greater than the radial width L2.

Figure 8:
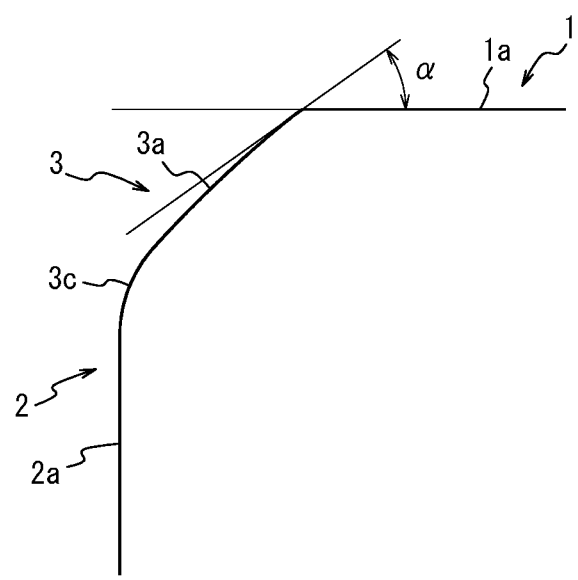
FIG. 8 is a variation of the chamfered edge illustrated in FIG. 2 where the first arcuate surface is formed in a curved shape that is almost flat.

As illustrated in a variation in FIG. 8, the chamfered edge 3 may include the first arcuate surface 3a and the third arcuate surface 3c omitting the second arcuate surface 3b, and the first arcuate surface 3a may be shaped to be almost flat. When the first arcuate surface 3a is shaped to be almost flat, the chamfered edge 3 may be defined by the circumferential width L1, the radial width L2, and the radial R3 of the third arcuate surface 3c.

As to the piston ring 1 illustrated in FIG. 6, FIG. 7, and FIG. 8, the chamfered edge 3, as illustrated in FIG. 8, for example, is formed in such a manner that, at an intersection of the first arcuate surface 3a and the outer peripheral surface 1a of the piston ring 1, a tangential direction of the first arcuate surface 3a is inclined at an acute angle α relative to a tangential direction of the outer peripheral surface 1a of the piston ring 1. That is, the chamfered edge 3 includes an edge at the intersection of the first arcuate surface 3a and the outer peripheral surface 1a of the piston ring 1. In this way, the chamfered edge 3 may border the outer peripheral surface 1a of the piston ring 1 in a non-curved manner.

Figure 9A:
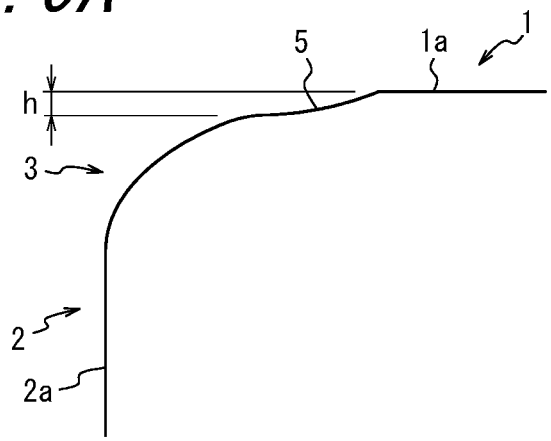
FIGS. 9A to 9C are variations of the chamfered edge illustrated in FIG. 2 where the chamfered edge includes a step.
Figure 9B:
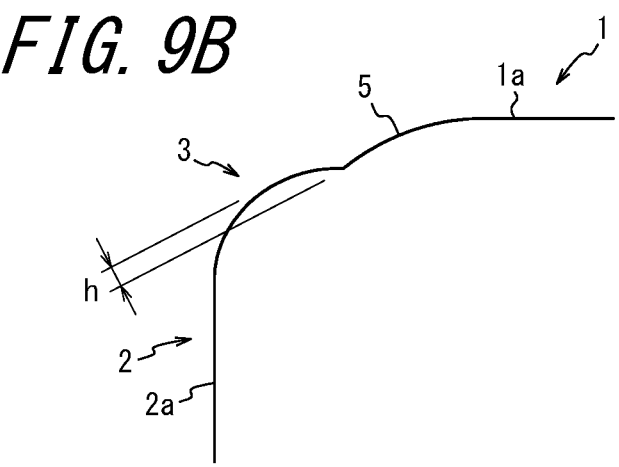
Figure 9C:
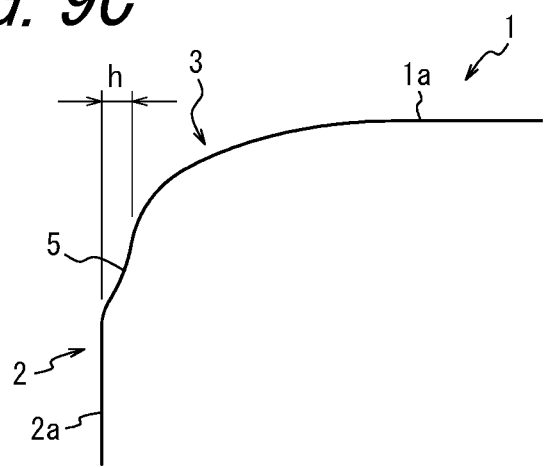

As illustrated in variations in FIGS. 9A to 9C, the chamfered edge 3 may include a step 5. For example, the step 5 may be a recess with a height h formed between the chamfered edge 3 and the outer peripheral surface 1a of the piston ring 1 as illustrated in FIG. 9A, or a protuberance with a height h formed between the chamfered edge 3 and the outer peripheral surface 1a of the piston ring 1 as illustrated in FIG. 9B. Or, the step 5 may be a step with a height h formed between the chamfered edge 3 and the piston ring end face 2a as illustrated in FIG. 9C. The height h of the step 5 is preferably 5 μm or less. As described above, the chamfered edge 3 may have the step 5 with the height of 5 μm or less.

When the chamfered edge 3 is formed on each of the pair of piston ring end faces 2a facing each other across the piston ring gap 2 of the piston ring 1, a ratio of the circumferential width L1 of one of the chamfered edges 3 along the circumferential direction of the piston ring 1 (not illustrated and will be referred to as "L1a" hereinafter) to the circumferential width L1 of the other of the chamfered edges 3 along the circumferential direction of the piston ring 1 (not illustrated and will be referred to as "L1b" hereinafter), i.e., L1a/L1b is preferably 0.30 to 3.00. Also, a ratio of the radial width L2 of one of the chamfered edges 3 along the radial direction of the piston ring 1 (not illustrated and will be referred to as "L2a" hereinafter) to the radial width L2 of the other of the chamfered edges 3 along the radial direction of the piston ring 1 (not illustrated and will be referred to as "L2b" hereinafter), i.e., L2a/L2b is preferably 0.30 to 3.00. In this way, the incidence of the chipping of the chamfered edge 3 may be reduced while a passage area of the piston ring gap 2 may be reduced, abating the amount of the blow-by gas.

When each of the pair of piston ring end faces 2a facing each other across the piston ring gap 2 of the piston ring 1 is provided with the chamfered edge 3 including the first arcuate surface 3a, the second arcuate surface 3b formed between the first arcuate surface 3a and the outer peripheral surface 1a of the piston ring 1, and the third arcuate surface 3c formed between the first arcuate surface 3a and the piston ring end face 2a, a ratio of the radius R1 of the first arcuate surface 3a of the one of the chamfered edges 3 (not illustrated and will be referred to as "R1a" hereinafter) to the radius R1 of the first arcuate surface 3a of the other of the chamfered edges 3 (not illustrated and will be referred to as "R1b" hereinafter), i.e., R1a/R1b is preferably 0.18 to 5.50. Also, a ratio of the radius R2 of the second arcuate surface 3b of the one of the chamfered edges 3 (not illustrated and will be referred to as "R2a" hereinafter) to the radius R2 of the second arcuate surface 3b of the other of the chamfered edges 3 (not illustrated and will be referred to as "R2b" hereinafter), i.e., R2a/R2b is preferably 0.18 to 5.50. Further, a ratio of the radius R3 of the third arcuate surface 3c of the one of the chamfered edges 3 (not illustrated and will be referred to as "R3a" hereinafter) to the radius R3 of the third arcuate surface 3c of the other of the chamfered edges 3 (not illustrated and will be referred to as "R3b" hereinafter), i.e., R3a/R3b is preferably 0.18 to 5.50. In this way, the incidence of the chipping of the chamfered edge 3 may be reduced while the passage area of the piston ring gap 2 may be reduced, abating the amount of the blow-by gas.

EXAMPLES

To confirm the effect of the disclosure herein, compression rings (piston rings) were prepared for examples 1 and 2, and another compression ring for a comparative example was prepared for comparison with the disclosure herein. The amounts of the blow-by gas (blow-by amounts, L/min) of these compression rings were measured and compared with one another.

For the compression ring according to the example 1, the chamfered edge was formed on each of a pair of piston ring end faces facing each other across the piston ring gap. The chamfered edge had a curved shape including the first arcuate surface, the second arcuate surface, and the third arcuate surface. The circumferential width and the radial width were each 0.055 to 0.075 mm, and a radio of the circumferential width to the radial width was 0.733 to 1.750. Also, a ratio of the circumferential width of one of the chamfered edges to the circumferential width of the other of the chamfered edges was 0.73 to 1.37, while a ratio of the radial width of one of the chamfered edges to the radial width of the other of the chamfered edges was 0.53 to 1.88. The radius of the first arcuate surface was 0.10 to 0.24 mm, the radius of the second arcuate surface was 0.04 to 0.16 mm, and the radius of the third arcuate surface was 0.015 to 0.050 mm. A ratio of the radius of the first arcuate surface of one of the chamfered edges to the radius of the first arcuate surface of the other of the chamfered edges was 0.41 to 2.40, a ratio of the radius of the second arcuate surface of one of the chamfered edges to the radius of the second arcuate surface of the other of the chamfered edges was 0.25 to 4.00, and a ratio of the radius of the third arcuate surface of one of the chamfered edges to the radius of the third arcuate surface of the other of the chamfered edges was 0.30 to 3.34. Further, a ratio of the radius of the first arcuate surface to the circumferential width of the chamfered edge was 1.333 to 4.364, a ratio of the radius of the first arcuate surface to the radial width of the chamfered edge was 1.818 to 4.459. A ratio of the radius of the second arcuate surface to the radius of the first arcuate surface was 0.261 to 0.800, and a ratio of the radius of the third arcuate surface to the radius of the first arcuate surface was 0.084 to 0.302.

For the compression ring according to the example 2, the chamfered edge was formed on each of a pair of piston ring end faces facing each other across the piston ring gap. The chamfered edge had a curved shape including the first arcuate surface, the second arcuate surface, and the third arcuate surface, and had the chamfered amount smaller than that of the example 1. That is, the compression ring according to the example 2 had the circumferential width of 0.017 to 0.044 mm and the radial width of 0.022 to 0.045 mm. Also, the compression ring according to the example 2 had a ratio of the circumferential width to the radial width of 0.640 to 1.471. A ratio of the circumferential width of one of the chamfered edges to the circumferential width of the other of the chamfered edges was 0.38 to 2.60, while a ratio of the radial width of one of the chamfered edges to the radial width of the other of the chamfered edges was 0.48 to 2.05. A radius of the first arcuate surface was 0.030 to 0.157 mm, a radius of the second arcuate surface was 0.013 to 0.043 mm, and a radius of the third arcuate surface was 0.006 to 0.033 mm. A ratio of the radius of the first arcuate surface of one of the chamfered edges to the radius of the first arcuate surface of the other of the chamfered edges was 0.19 to 5.24, a ratio of the radius of the second arcuate surface of one of the chamfered edges to the radius of the second arcuate surface of the other of the chamfered edges was 0.30 to 3.31, and a ratio of the radius of the third arcuate surface of one of the chamfered edges to the radius of the third arcuate surface of the other of the chamfered edges was 0.18 to 5.50. Further, a ratio of the radius of the first arcuate surface to the circumferential width of the chamfered edge was 1.207 to 4.103, a ratio of the radius of the first arcuate surface to the radial width of the chamfered edge was 1.028 to 4.489. A ratio of the radius of the second arcuate surface to the radius of the first arcuate surface was 0.154 to 0.781, and a ratio of the radius of the third arcuate surface to the radius of the first arcuate surface was 0.050 to 0.492.

For the compression ring according to the comparative example, on the other hand, chamfered edges in a flat C-shape were formed. The chamfered edges had both the circumferential width and the radial width of 0.055 to 0.075 mm, and a ratio of the circumferential width to the radial width of 0.733 to 1.136. Also, a ratio of the circumferential width of one of the chamfered edges to the circumferential width of the other of the chamfered edges was 0.73 to 1.37, and a ratio of the radial width of one of the chamfered edges to the radial width of the other of the chamfered edges was 0.53 to 1.88.

Using the compression rings according to the examples 1 and 2 and the comparative example designed as described above, a research for the incidence of the chipping and a prototype test of the amount of blow-by gas were conducted. For the measurement of the amount of the blow-by gas, the compression rings according to the examples 1 and 2 and the comparative example were separately mounted on a top-ring groove of the piston ring in a turbo-charged petrol engine of a water-cooled 4-cycle (2.0 L displacement, 4 cylinders). Each of the compression rings being mounted had the piston ring gap of 0.25 mm. Under conditions of 6000 rpm and a full load (Wide Open Throttle, WOT), the amount of the blow-by gas when this engine was run for a predetermined time period was measured. The amount of the blow-by gas was measured by re-sucking the gas flowing into the crank chamber via the piston and measuring an amount of the re-sucked gas. Results of the measurements of the incidence of the chipping and the amount of the blow-by gas are illustrated in Table 1 and FIG. 10. In the columns of L1, L2, and R1 to R3, the columns of "a" are for those of one of the ring gap end surfaces (L1$a$, L2$a$, R1$a$, R2$a$, and R3$a$ as mentioned above), while columns of "b" are for those of the other of the ring gap end surfaces (L1$b$, L2$b$, R1$b$, R2$b$, and R3$b$ as mentioned above).

It was also found that, when the chamfered amount of the chamfered edge or the chamfered amount of the chamfered edge, i.e., the circumferential width and the radial width are further reduced, the chamfered edge is capable of further reducing the incidence of the chipping than that of the chamfered edge of the compression ring having the flat C-shape such as one according to the comparative example.

Figure 10:
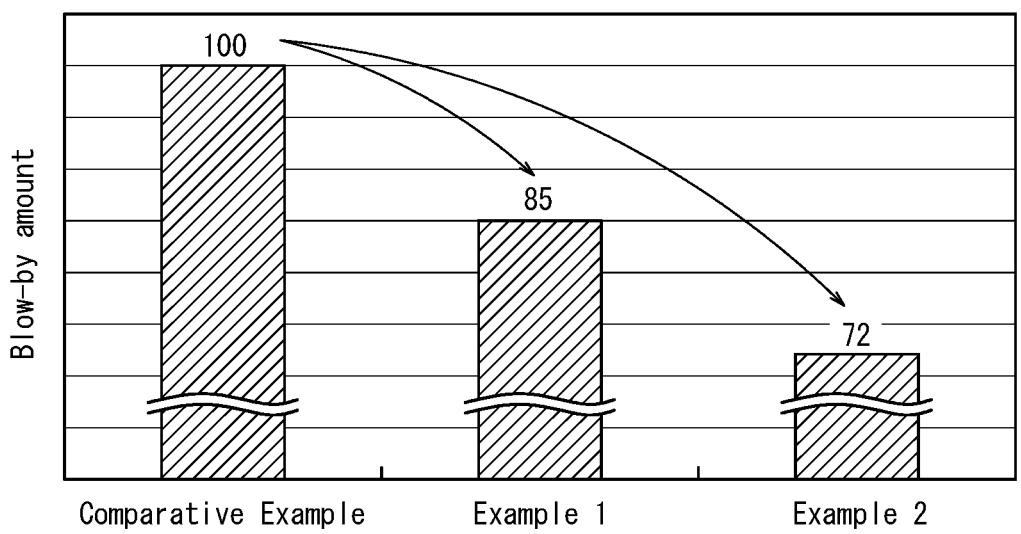
FIG. 10 is a graph illustrating a result of a measurement of an amount of a blow-by gas.

As illustrated in Table 1 and FIG. 10, on the other hand, relative to the compression ring according to the comparative example set to 100, the amount of the blow-by gas was 85 for the compression ring according to the example 1, and 72 for the compression ring according to the example 2.

From the result of the research, it was found that, when the chamfered amount of the chamfered edge or the chamfered amount of the chamfered edge, i.e., the circumferential width and the radial width are equal to each other, the chamfered edge of the compression ring having the curved shape such as one according to the example 1 is capable of reducing the amount of the blow-by gas 15% more than the chamfered edge of the compression ring having the flat C-shape such as one according to the comparative example.

It was also found that, when the chamfered amount of the chamfered edge or the chamfered amount of the chamfered edge, i.e., the circumferential width and the radial width are further reduced, the chamfered edge is capable of reducing the amount of the blow-by gas 28% more than the chamfered

TABLE 1

|  | L1 | | L2 | | L1/ | L1a/ | L2a/ | R1 | | R2 | |
| --- | --- | --- | --- | --- | --- | --- | --- | --- | --- | --- | --- |
|  | a | b | a | b | L1 | L1b | L2b | a | b | a | b |
| Example 1 | 0.055-0.075 | 0.055-0.075 | 0.055-0.075 | 0.055-0.075 | 0.733-1.750 | 0.73-1.37 | 0.53-1.88 | 0.10-0.24 | 0.10-0.24 | 0.04-0.16 | 0.04-0.16 |
| Example 2 | 0.017-0.044 | 0.017-0.044 | 0.022-0.045 | 0.022-0.045 | 0.640-1.471 | 0.38-2.6 | 0.48-2.05 | 0.0-0.157 | 0.03-0.157 | 0.013-0.043 | 0.013-0.043 |
| Comparative Example | 0.055-0.075 | 0.055-0.075 | 0.055-0.075 | 0.055-0.075 | 0.733-0.136 | 0.73-1.37 | 0.53-1.88 | — | — | — | — |

|  | R3 | | R1a/ | R2a/ | R3a/ |  |  |  |  | Incidence of Chipping Frequency | Blow-by Amount |
| --- | --- | --- | --- | --- | --- | --- | --- | --- | --- | --- | --- |
|  | a | b | R1b | R2b | R3b | R1/L1 | R1/L2 | R2/R1 | R3/R1 | (%) | (Ratio) |
| Example 1 | 0.015-0.05 | 0.015-0.05 | 0.41-2.40 | 0.25-4.0 | 0.3-3.34 | 1.333-4.364 | 0.818-4.459 | 0.261-0.800 | 0.084-0.302 | 0.35 | 85 |
| Example 2 | 0.006-0.033 | 0.006-0.033 | 0.19-5.24 | 0.30-3.31 | 0.18-5.50 | 1.207-4.103 | 1.028-4.489 | 0.154-0.781 | 0.050-0.492 | 0.41 | 72 |
| Comparative Example | — | — | — | — | — | — | — | — | — | 2.25 | 100 |

As illustrated in Table 1, the incidence of the chipping of the chamfered or chamfered edges was 0.35% for the compression ring according to the example 1, 0.41% for the compression ring according to the example 2, and 2.25% for the compression ring according to the comparative example.

From the result of the research, it was found that, when the chamfered amount of the chamfered edge or a chamfered amount of the chamfered edge, i.e., the circumferential width and the radial width are equal to each other, the chamfered edge of the compression ring having the curved shape such as one according to the example 1 is capable of further reducing the incidence of the chipping of the chamfered edge than that of the chamfered edge of the compression ring having the flat C-shape such as one according to the comparative example.

edge of the compression ring having the flat C-shape such as one according to the comparative example.

From the results as described above, it was found that the chamfered edge having the curved shape enables the size reduction thereof without increasing the incidence of the chipping and the size reduction of the flow passage of the blow-by gas in the piston ring gap, effectively restraining the blow-by gas from passing through the piston ring gap.

It should be appreciated that the disclosure herein is not limited to the above embodiment but may be implemented in various manners without departing from the scope of the disclosure herein.

For example, in the above embodiment the chamfered edge 3 has the curved shape including the first, second, and third arcuate surfaces 3$a$, 3$b$, and 3$c$ or first and third arcuate surfaces 3$a$ and 3$c$. However, the chamfered edge 3 is not limited thereto and may have a curved shape including at least two arcuate surfaces overlapping one another.

Further, although in the above embodiment the pair of piston ring end faces 2a at the piston ring gap 2 each include the chamfered edge 3, only one of the pair of piston ring end faces 2a at the piston ring gap 2 may include the chamfered edge 3.

REFERENCE SIGNS LIST 1 piston ring
1a outer peripheral surface
2 piston ring gap
2a piston ring end face
3 chamfered edge
3a first arcuate surface
3b second arcuate surface
3c third arcuate surface
4 C-shaped surface
5 step
P1 intersection
P1a intersection
P1b intersection
P2 intersection
P2a intersection
P2b intersection
R1 radius of first arcuate surface
R2 radius of second arcuate surface
R3 radius of third arcuate surface
L1 circumferential width
L2 radial width
α angle
h height

The invention claimed is:

1. A piston ring with a piston ring gap used for an internal combustion engine, the piston ring comprising:
a chamfered edge continuous to at least one of piston ring end faces at the piston ring gap and an outer peripheral surface of the piston ring,
wherein the chamfered edge has a curved shape,
the chamfered edge includes a first arcuate surface, a second arcuate surface formed between the first arcuate surface and the outer peripheral surface of the piston ring, and a third arcuate surface formed between the first arcuate surface and the piston ring end face, and
a ratio R3/R1 of a radius R3 of the third arcuate surface to a radius R1 of the first arcuate surface is 0.050 to 0.500.

2. The piston ring according to claim 1,
wherein, at an intersection between the chamfered edge and the outer peripheral surface of the piston ring, a tangential direction of the chamfered edge tilts at an acute angle relative to a tangential direction of the outer peripheral surface of the piston ring.

3. The piston ring according to claim 1,
wherein the chamfered edge has a circumferential width L1 along a circumferential direction of the piston ring greater than a radial width L2 along a radial direction of the piston ring.

4. The piston ring according to claim 1,
wherein the chamfered edge has a ratio L1/L2 of a circumferential width L1 along a circumferential direction of the piston ring to a radial width L2 along a radial direction of the piston ring between 0.6 to 2.0.

5. The piston ring according to claim 1,
wherein the circumferential width L1 is within range of 0.017 to 0.044 mm or 0.055 to 0.075 mm.

6. The piston ring according to claim 1,
wherein the radial width L2 is within range of 0.022 to 0.045 mm or 0.055 to 0.075 mm.

7. The piston ring according to claim 1,
wherein the piston ring is a compression ring.

8. A piston ring with a piston ring gap used for an internal combustion engine, the piston ring comprising:
a chamfered edge continuous to at least one of piston ring end faces at the piston ring gap and an outer peripheral surface of the piston ring,
wherein the chamfered edge has a curved shape,
the chamfered edge includes a first arcuate surface, a second arcuate surface formed between the first arcuate surface and the outer peripheral surface of the piston ring, and a third arcuate surface formed between the first arcuate surface and the piston ring end face, and
a ratio R2/R1 of a radius R2 of the second arcuate surface to the radius R1 of the first arcuate surface is 0.1 to 0.8.

9. The piston ring according to claim 8,
wherein, at an intersection between the chamfered edge and the outer peripheral surface of the piston ring, a tangential direction of the chamfered edge tilts at an acute angle relative to a tangential direction of the outer peripheral surface of the piston ring.

10. The piston ring according to claim 8,
wherein the chamfered edge has a circumferential width L1 along a circumferential direction of the piston ring greater than a radial width L2 along a radial direction of the piston ring.

11. The piston ring according to claim 8,
wherein the chamfered edge has a ratio L1/L2 of a circumferential width L1 along a circumferential direction of the piston ring to a radial width L2 along a radial direction of the piston ring between 0.6 to 2.0.

12. The piston ring according to claim 8,
wherein the circumferential width L1 is within range of 0.017 to 0.044 mm or 0.055 to 0.075 mm.

13. The piston ring according to claim 8,
wherein the radial width L2 is within range of 0.022 to 0.045 mm or 0.055 to 0.075 mm.

14. The piston ring according to claim 8,
wherein the piston ring is a compression ring.

* * * * *